United States Patent [19]

Koester et al.

[11] 4,307,669
[45] Dec. 29, 1981

[54] LUBRICATION RETAINING BEARING

[75] Inventors: George S. Koester, Los Angeles; Henry R. Hullhorst, Mission Viejo, both of Calif.

[73] Assignee: The American Roto Bearing Co., Los Angeles, Calif.

[21] Appl. No.: 14,419

[22] Filed: Feb. 23, 1979

[51] Int. Cl.³ .................. B61F 5/16; F16C 17/04; F16C 17/10
[52] U.S. Cl. ................... 105/199 C; 308/137; 428/461
[58] Field of Search ............ 105/199 C; 308/137; 428/461

[56] References Cited

U.S. PATENT DOCUMENTS

| 3,082,702 | 3/1963 | Mohr, Jr. | 105/199 C |
| 3,170,740 | 2/1965 | Smith | 308/137 |
| 3,466,102 | 9/1969 | Goodwyn | 105/199 C |
| 3,986,752 | 10/1976 | Bogar et al. | 105/199 C |
| 4,188,888 | 2/1980 | Cooper et al. | 105/199 C |

Primary Examiner—Richard A. Bertsch
Attorney, Agent, or Firm—Fulwider, Patton, Rieber, Lee & Utecht

[57] ABSTRACT

For use in a railway car truck, a lubrication retaining shim bearing is arranged to be inserted between the railway car center plate and its associated center bowl on the truck bolster. The bearing includes an upper shim for engaging the railway car center plate, a lower shim for resting in the center bowl, and a middle shim having a plurality of apertures therethrough. A lubricant is retained between the upper and lower shims, and between the shims and their respective parts of the railway car. In an alternative embodiment, the upper and lower shims are fixed with respect to the railway car center plate and center bowl respectively, and the lubricant is confined between the upper and lower shims.

9 Claims, 7 Drawing Figures

LUBRICATION RETAINING BEARING

BACKGROUND OF THE INVENTION

This invention relates to lubrication retaining bearings, and more particularly, to a bearing for retaining a lubricant between a railway car center plate and its associated center bowl on the car truck bolster.

As is well known in the art, the interface between the center plate of a railway car and the center bowl on the car truck bolster, where the weight of the car is borne by the truck, is subject to considerable wear, and when either of these parts has become too worn, it must be replaced at great expense to the car owner. Moreover, when insufficient lubricant is provided between the center plate and center bowl, these two parts occasionally lock together and interfere with the normal safe operation of the car truck, as for example, the truck's ability to safely follow a curve in a railway track. Accordingly, to minimize wear of these large and expensive parts of a railway car, and to prevent locking of the center plate and bowl, it is highly desirable to provide lubrication between each center plate and its associated center bowl.

One way in which this has been accomplished is by simply placing a quantity of lubricant in the center bowl before lowering the car body onto the trucks with its center plates resting in the center bowls. Of course, this has the effect of lubricating the center plate/center bowl interface, as desired, but the lubricant can and does easily escape from the center bowl. Accordingly, unless the supply of lubricant in the bowl is frequently replenished, the railway car operates without sufficient lubricant in the center bowl, and excessive wear and possible malfunction of the truck's tracking ability is likely to occur.

Since placing of lubricant in the center bowl by the above method requires separating the railway car body from the car trucks, and this operation normally requires a crane to lift the body off of the trucks, the lubrication procedure is, of necessity, expensive and time consuming. Moreover, with lubrication methods known heretofore, the procedure must be performed relatively frequently to avoid excessive wear or malfunction of the center plates and center bowls of a railway car.

Accordingly, in order to enhance the safe operation of a railway car and permit less frequent lubrication of the center plate/center bowl interfaces, there has existed a need for a convenient and effective device for retaining a lubricant between a center plate and center bowl of a railway car, which device is relatively inexpensive to manufacture and easy to use. As will become apparent from the following, the present invention satisfies that need.

SUMMARY OF THE INVENTION

The present invention resides in a new and improved lubrication retaining shim bearing particularly adapted for use in a railway car truck center bowl for retaining lubricant between the car body center plate and the bolster center bowl. The bearing of the present invention greatly reduces the cost of operating a conventional railway car by reducing the frequency with which the center plate/center bowl interface requires lubrication, thereby preventing excessive wear of expensive railway car parts while permitting less frequent maintenance of each car. Further, by facilitating the retention of lubricant between the center plate and center bowl, malfunction of the railway car's tracking ability is greatly reduced. Moreover, the bearing of the present invention is relatively inexpensive to manufacture, is trouble-free and reliable in use, and can be installed easily and conveniently in a conventional railway car truck.

More specifically, the bearing of the present invention includes an upper shim for engaging the railway car center plate, a lower shim for resting in the center bowl, and a middle shim disposed between the upper and lower shims and having a plurality of apertures therethrough. A lubricant is provided between the upper and lower shims, surrounding the middle shim and filling the apertures therein, and the lubricant is retained between the shims by lips on the upper and lower shims which surround the periphery of the middle shim and are disposed in close proximity to one another.

In a preferred embodiment of the present invention, the upper and lower shims include apertures which communicate with the apertures in the middle shim for permitting the lubricant to lubricate the interfaces between the bearing and the railway car center plate and bowl. In an alternative embodiment of the bearing, the surfaces of the upper and lower shims which contact the middle shim include recesses which act as reservoirs for the lubricant and communicate with the apertures in the middle shim. Separate recesses can be provided in the surfaces of the upper and lower shims which contact the railway car parts for supplying lubricant to those interfaces.

In another alternative embodiment of the present invention, the upper and lower shims include a means for preventing relative movement between the upper shim and the railway car center plate and between the lower shim and the center bowl. The means employed can be a relatively hard projection extending from the upper or lower shims and arranged to engage the center plate or center bowl. With this arrangement, since no relative movement occurs between the bearing parts and the repsective parts of the railway car which they contact, the lubricant can be entirely contained within the bearing.

Other features and advantages of the present invention will become apparent from the following detailed description, taken in conjunction with the accompanying drawings, which illustrate, by way of example, the principles of the invention.

DETAILED DESCRIPTION

Figure 1:
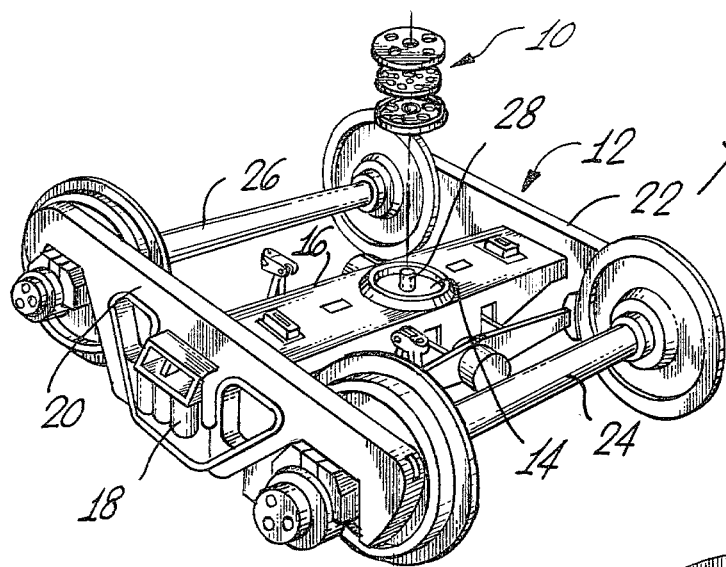
FIG. 1 is a perspective view of a lubrication retaining bearing embodying the present invention, and illustrated in exploded position above a conventional railway car truck.
Figure 3:
FIG. 3 is an enlarged plan view of the upper shim of the bearing of FIG. 2.

As shown in the exemplary drawings, the present invention is embodied in a lubrication retaining bearing, indicated generally by reference numeral 10 in FIG. 1, and herein illustrated and described as being adapted for use in a conventional railway car truck 12. It will be appreciated, however, that this invention is also suited for other applications, the present application being offered by way of example and not by way of limitation.

In this instance, the bearing 10 is shown as adapted to be disposed in a center bowl 14 located in the middle of a car truck bolster 16. As is well known in the art, the bolster 16 supports the weight of the car body (not shown) by being supported at each end on a cluster of springs 18 in two side frames 20 and 22, which are rigidly supported by the wheel and axle assemblies 24 and 26.

Figure 2:
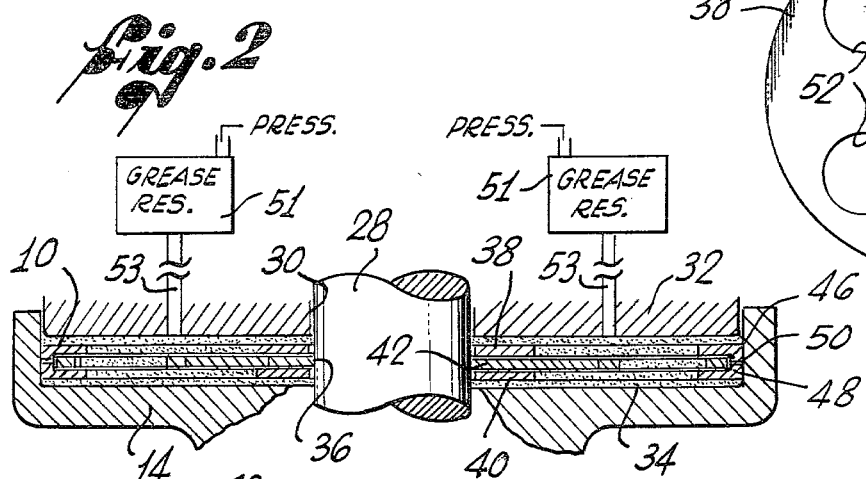
FIG. 2 is an enlarged elevational view, partly in cross section, of a lubrication retaining bearing embodying the present invention, illustrated as assembled for use between a conventional railway car truck center bowl and center plate, and schematically illustrating an auxiliary lubricant reservoir system.

In order to assist in aligning a railway car body on the car truck 12, the center bowl 14 includes a center pin 28, and as can best be seen in FIG. 2, the pin 28 extends upwardly from the bottom of the bowl 14 and engages a cental opening 30 in a railway car center plate 32. The center pin 28 thereby serves to maintain the center plate 32 centered within the bowl 14 while permitting relative rotation of the center plate with respect to the bowl about the pin axis, as when the car truck encounters a curve in a railway track.

In accordance with the present invention, the bearing 10 is interposed between the center bowl 14 and center plate 32 and is arranged to retain a lubricant 34 therebetween for an extended period of time. Moreover, the bearing 10 of this invention is relatively inexpensive to manufacture, is trouble-free and reliable in use, and can be installed easily and conveniently in a conventional railway car truck.

The bearing 10 is comprised of three generally flat shims which are stacked one upon the other and dimensioned to fit within the center bowl 14. For the purpose of retaining the bearing in place within the bowl 14, all three shims of the bearing include a central aperture 36 in which is received the center pin 28. The shims are preferably disc-shaped to permit relative rotation with respect to each other about the axis of the pin 28.

More specifically, the bearing 10 includes an upper shim 38 arranged to engage the railway car center plate 32, a lower shim 40 arranged to engage the center bowl 14, and a middle shim 42 disposed between the upper and lower shims. The middle shim 42 has a plurality of apertures 44 passing vertically therethrough, and the lubricant 34 fills the interstices between the upper shim 38 and lower shim 40, including the apertures 44. By this arrangement, the lubricant within the bearing 10 can communicate freely through the middle shim 42 between the upper and lower shims.

In order to retain the lubricant within the bearing 10, the middle shim 42 has a slightly smaller outside diameter than the upper and lower shims 38 and 40, and the upper and lower shims are formed with a downwardly facing circumferential lip 46 and an upwardly facing circumferential lip 48, respectively, which surround the periphery of the middle shim 42 and are disposed in close overlying proximity to one another in order to form a lubrication retaining seal 50 at about the midpoint of the thickness of the middle shim 42. During normal use of the bearing 10, the lips 46 and 48 contact one another and remain in contact as the bearing wears, thereby providing a positive seal to retain the lubrication within the bearing over an extended period of time. Other arrangements for providing the seal 50 can be employed, such as havng either the downwardly facing lip 46 on the upper shim or the upwardly facing lip 48 on the lower shim extend across more than half of the thickness of the middle shim, but the arrangement illustrated and described above is presently preferred.

Figure 4:
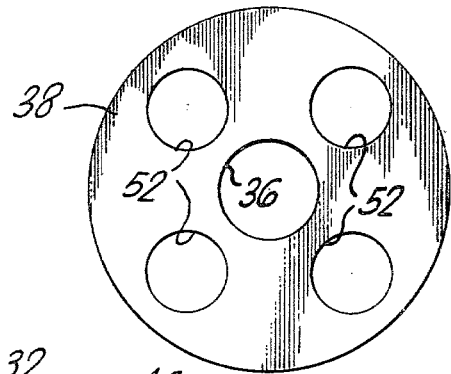
FIG. 4 is an enlarged plan view of the middle shim of the bearing of FIG. 2.
Figure 5:
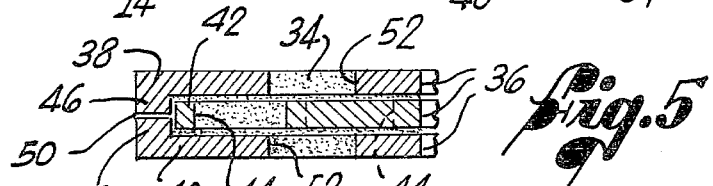
FIG. 5 is a further enlarged, fragmentary, elevational view in cross section of the bearing of FIG. 2.

As can best be seen in FIG. 4, the apertures 44 in the middle shim 42 are circular and arranged in a regular pattern about the center of the shim 42. Of course, it will be appreciated that many other arrangements of apertures can be employed, as well as the inclusion of radial or circumferential grooves, (not shown) in the upper and lower surfaces of the middle shim 42 to enhance distribution of the lubricant between the middle shim and the upper and lower shims 38 and 40.

In the preferred embodiment of the present invention, illustrated by way of example in FIGS. 1 through 5, the upper and lower shims 38 and 40 are substantially identical, and each includes a plurality of relatively large apertures 52 (FIG. 3) which are dimensioned and positioned to overlap and comunicate with the apertures 44 in the middle shim 42. With this arrangement, the lubricant 34 can pass through the apertures 52 and coat the interface between the upper shim 38 and the railway car center plate 32, as well as the interface between the lower shim 40 and the center bowl 14. Moreover, the upper surface of the upper shim 38 and the lower surface of the lower shim 40 are smooth, thereby permitting relative movement between the upper shim 38 and the center plate 32 and between the lower shim 40 and the center bowl 14. If desired, as with the middle shim 42, the apertures 52 can be of any configuration, and radial or circumferential grooves (not shown) can be provided in the surfaces of the upper and lower shims which contact the center plate and center bowl to enhance distribution of lubricant over those surfaces. Further, the edges of the apertures 44 and 52 are preferably chamferred as at 55 to permit the lubricant 34 to readily flow into and out of the apertures when the shims are in close engagement with one another as a result of the compressive load imposed by the railway car through the center plate 32.

If desired, in order to provide a constant supply of lubricant to the bearing 10 at the center bowl/center plate interface, a reservoir 51 containing a supply of lubricant 34 can be carried on the railway car, and the lubricant can be supplied to the bearing through supply lines 53 which can pass through the center plate 32, as illustrated schematically in FIG. 2. As further indicated, pressure can be applied to the reservoir or reservoirs 51 in any suitable manner to urge the lubricant through the supply lines 53 to the bearing 10.

Figure 6:
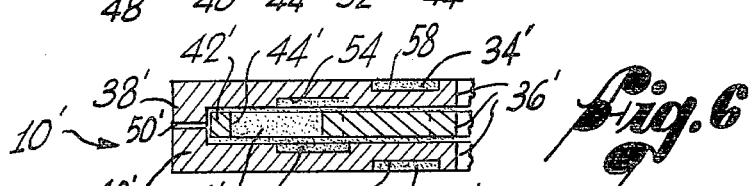
FIG. 6 is a fragmentary view, similar to the view of FIG. 5, and illustrating an alternative embodiment of the bearing of the present invention.

An alternative embodiment of the present invention is illustrated in FIG. 6, and in this instance, the bearing 10' is similar to that previously discussed in connection with FIGS. 1-5, and parts of the bearing illustrated in FIG. 6, which find substantial correspondence in structure and function to those previously discussed in connection with FIGS. 1-5, have been designated with corresponding primed reference numerals. Specifically, the bearing 10' includes an upper shim 38', a lower shim 40' and a middle shim 42' through which a central aperture 36' passes for receiving the center pin 28. A lubricant 34' fills in the interstices between the upper and lower shims, including a plurality of apertures 44' in the middle shim 42', and the lubricant is retained within the bearing 10' by a seal 50'.

To provide a reservoir for holding lubricant within the bearing 10', a recess 54 is provided in the lower surface of the upper shim 38', and a similar recess 56 is provided in the upper surface of the lower shim 40'. The recesses 54 and 56 overlap and communicate with the apertures 44' in the middle shim 42' and can be of any desired configuration, such as radial or circumferential grooves.

The upper surface of the upper shim 38' and the lower surface of the lower shim 40' are generally smooth, thereby permitting relative movement with respect to an abutting surface. To provide lubrication of these surfaces, a recess 58, or series of recesses, is provided in the upper surface of the upper shim 38' and a similar recess 60, or series of recesses, is provided in the lower surface of the lower shim 40'. A lubricant 34' is provided in the recesses 58 and 60 and can be evenly distributed over its respective surface by the provision by radial or circumferential grooves, as described above.

Figure 7:
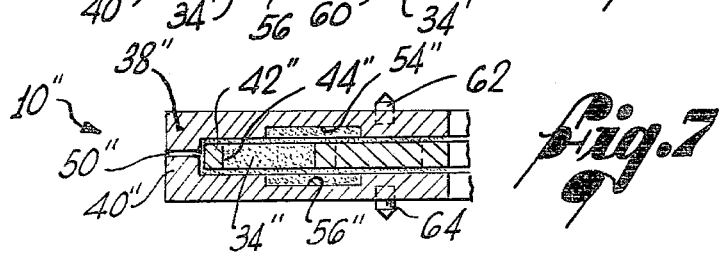
FIG. 7 is a fragmentary view, similar to the view of FIGS. 5 and 6, and illustrating a second alternative embodiment of the bearing of the present invention.

Another alternative embodiment of the present invention is illustrated in FIG. 7, and in this instance, parts of the bearing 10" which find substantial correspondence in structure and function to those previously discussed in connection with FIGS. 1-6, have been designated with corresponding double-primed reference numerals. As above, the bearing 10" includes an upper shim 38", a lower shim 40", and a middle shim 42" having a plurality of apertures 44" therein, and a lubricant 34" is retained between the upper and lower shims by a seal 50". To increase the quantity of lubricant retained between the upper and lower shims, a recess 54" is provided in the upper shim, and a recess 56" is provided in the lower shim.

For the purpose of holding the upper shim 38" in a fixed position with respect to an abutting surface above the upper shim, a relatively hard, sharp projection 62 extends upwardly from the upper shim 38". To retain the lower shim 40" in a fixed position with respect to another abutting surface below the lower shim, a similar projection 64 extends downwardly from the lower shim 40". Although the projections 62 and 64 have been illustrated as inserts in the shims, it will be apparent that any projection, such as an integral raised lip or ridge, will serve to prevent relative movement between the shims 38" and 40" and their respective abutting surfaces. Further, since the upper and lower shims of the bearing 10" remain stationary with respect to their abutting surfaces, no lubrication is required above or below the bearing 10", and all of the lubricant 34" can be retained between the upper and lower shims 38" and 40".

From the foregoing, it will be appreciated that the bearing 10 of the present invention provides a device by which a lubricant can be retained between two relatively movable surfaces, such as a center plate and center bowl of a railway car, thereby reducing the wear of said surfaces, enhancing the safe operation of the railway car, and permitting less frequent maintenance thereof. Further, the bearing 10 can be fabricated conveniently and economically, is easy to install, and is adaptable for use in many applications where retention of lubrication for an extended period of time is required or desirable.

While several particular forms of the invention have been illustrated and described, it will also be apparent that various modifications can be made without departing from the spirit and scope of the invention.

We claim:

1. A lubrication retaining bearing adapted to be interposed between a first surface and a second abutting surface parallel to said first surface and arranged to rotate with respect to said first surface about a rotational axis perpendicular to said surfaces, said first and second surfaces being arranged to bear a compressive load in the direction of said rotational axis, said bearing comprising:
    a first shim having an outer surface arranged to engage said first surface;
    a second shim having an outer surface arranged to engage said second surface;
    a third shim disposed between said first and second shims, contacting an inner surface of said first shim and an inner surface of said second shim, said third shim having a plurality of apertures extending therethrough;
    a lubricant filling the interstices between said first and second shims, surrounding said third shim and filling said apertures; and
    means adjacent the outer periphery of said bearing for retaining said lubricant between said first and second shims.

2. A bearing as defined in claim 1 wherein said first, second and third shims are disc-shaped, said third shim having an outer diameter less than the outer diameter of said first shim, and said means for retaining said lubricant between said first and second shims is a circumferential lip on said first shim which extends axially and at least partially surrounds the periphery of said third shim.

3. A bearing as defined in claim 2 wherein said second shim has an outer diameter substantially equal to said first shim, and said means for retaining said lubricant further includes a circumferential lip on said second shim which extends axially toward and engages said lip on said first shim forming a seal around the periphery of said bearing.

4. A bearing as defined in claim 1 wherein said first and second shims include a plurality of apertures therethrough arranged to communicate with said apertures in said third shim.

5. A bearing as defined in claim 1 wherein said first and second shims include a plurality of recesses in said inner surfaces arranged to communicate with said apertures in said third shim.

6. A bearing as defined in claim 5 wherein said first and second shims include a plurality of recesses in said outer surfaces, said recesses in said outer surfaces being filled with lubricant and serving as a reservoir for supplying said lubricant between said first shim and said first surface and between said second shim and said second surface.

7. A bearing as defined in claim 4 wherein the edges of the apertures in each of said shims are chamferred to facilitate distribution of said lubricant.

8. A lubrication retaining bearing adapted to be interposed between a first surface and a second abutting surface parallel to said first surface and arranged to rotate with respect to said first surface about a rotational axis perpendicular to said surfaces, said first and second surfaces being arranged to bear a compressive load in the direction of said rotational axis, said bearing comprising;
- a first shim having an outer surface arranged to engage said first surface;
- a second shim having an outer surface arranged to engage said second surface;
- a third shim disposed between said first and second shims, contacting an inner surface of said first shim and an inner surface of said second shim, said third shim having a plurality of apertures extending therethrough;
- a lubricant filling the interstices between said first and second shims, surrounding said third shim and filling said apertures;
- means adjacent the outer periphery of said bearing for retaining said lubricant between said first and second shims;
- said first and second shims including a plurality of recesses in said inner surfaces arranged to communicate with said apertures in said third shim; and
- said bearing further including means on said outer surface of said first and second shims for preventing relative movement between said first shim and said first surface and between said second shim and said second surface.

9. A bearing as defined in claim 8 wherein said means for preventing relative movement is a relatively hard projection extending axially outwardly from said outer surfaces of said first and second shims, and arranged to engage said first and second surfaces.

* * * * *